United States Patent [19]
Reddaway

[11] 3,979,728
[45] Sept. 7, 1976

[54] ARRAY PROCESSORS
[75] Inventor: Stewart Fiddian Reddaway, Baldock, England
[73] Assignee: International Computers Limited, Stevenage, England
[22] Filed: Apr. 1, 1974
[21] Appl. No.: 456,829

[30] Foreign Application Priority Data
Apr. 13, 1973 United Kingdom............ 17809/73

[52] U.S. Cl. ............................................ 340/172.5
[51] Int. Cl.² ........................................... G06F 15/16
[58] Field of Search..................... 340/172.5; 445/1

[56] References Cited
UNITED STATES PATENTS

| | | | |
|---|---|---|---|
| 3,541,516 | 11/1970 | Senzig............................. | 340/172.5 |
| 3,611,307 | 10/1971 | Podvin............................ | 340/172.5 |
| 3,701,976 | 10/1972 | Shively........................... | 340/172.5 |
| 3,745,533 | 7/1973 | Erwin et al. ..................... | 340/172.5 |
| 3,757,312 | 9/1973 | Shore et al..................... | 340/172.5 X |
| 3,815,095 | 6/1974 | Wester............................ | 340/172.5 |
| 3,820,079 | 6/1974 | Bergh et al. .................... | 340/172.5 |

Primary Examiner—Mark E. Nusbaum
Attorney, Agent, or Firm—Misegades, Douglas & Levy

[57] ABSTRACT

An array processor, operative as the peripheral of a sequential machine. Each processing element is organized on a bit-serial basis, with single-bit registers and a bit-addressable store, and the array is controlled by a microprogrammed main control unit. These features result in an extremely flexible arrangement.

15 Claims, 6 Drawing Figures

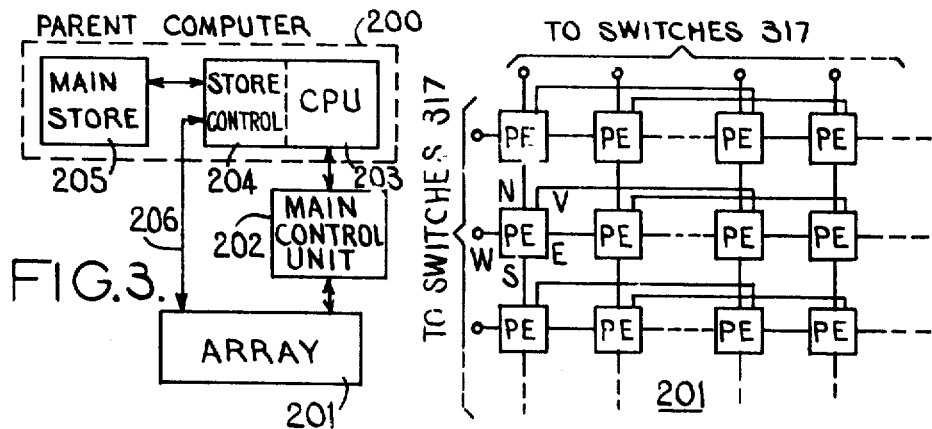
FIG.3.
FIG.4.
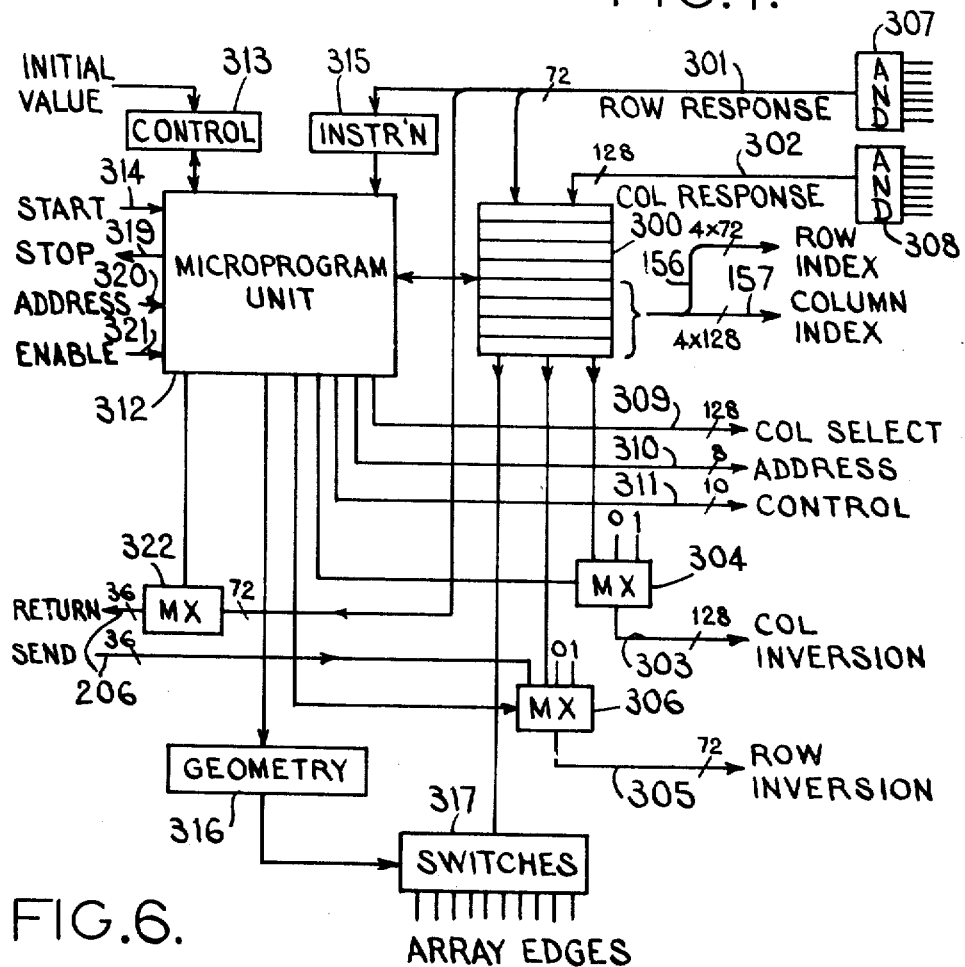
FIG.6.

ARRAY PROCESSORS

BACKGROUND OF THE INVENTION

This invention relates to array processing.

There exists a class of problems which involve performing similar sequences of operations on a large number of different sets of data. For example, in meteorological forecasting, the initial values of a number of variables (e.g. pressure, wind speed) are specified for each of a large number of grid points. Future values of the variables are then required to be calculated for each grid point from the initial data.

Clearly, such calculations can impose a very heavy load on a data processing system. In order to facilitate and to speed up the performance of such calculations, it has been proposed to provide array processing apparatus comprising a large number of processing elements with a common control unit which sends instructions to all the processing elements for execution in parallel. The processing elements can thus be arranged to handle the different sets of data concurrently, with a corresponding reduction in overall processing time. Such processing apparatus has been referred to as "single-instruction-stream multiple-data-stream" apparatus.

One such apparatus which has been proposed is the SOLOMON computer (Slotnick et al., Fall Joint Computer Conference 1962, Page 97; Gregory et al., IEEE Transactions on Electronic Computers, Dec. 1963, Page 774). This consists of an array of relatively simple processing elements, each of which is arranged to perform arithmetic operations upon input data in a bit-serial manner. A development of this is the ILLIAC IV computer (Barnes et al., IEEE Transactions on Computers, Aug. 1968, page 746; Bouknight et al., Proceedings of the IEEE, April 1972, page 369). Again, this consists of an array of processing elements, but each element is considerably more complex than in the SOLOMON case, and performs airthmetic operations in a bit-parallel manner.

SUMMARY OF THE INVENTION

One feature of the present invention is a return to the use of bit-serial arithmetic but, in distinction from the SOLOMON case, the provision of a microprogrammed common control unit for the processing element array. This feature has been found to provide considerable advantages, permitting optimum use of the storage in each processing element, the choise of optimum word length for the particular problem at hand, and greater flexibility in the processing of data by the array. Another feature of the present invention is that the processing element array is arranged to operate in response to high-level instructions from a general-purpose, sequential computer. The overall program of the apparatus resides in the parent computer, with the array acting as a peripheral of the computer.

Thus, according to the present invention, there is provided data processing apparatus comprising a general purpose sequential computer; an array of substantially identical processing elements each including a multi-bit memory the bits of which are individually addressable and an arithmetic unit arranged to perform arithmetic operations on single-bit operands; and a control unit common to all the processing elements for receiving high-level instructions from the computer, for interpreting each instruction into a sequence of micro-instructions in accordance with a stored, alterable microgram, and for causing said micro-instructions to be executed in parallel by said processing elements.

BRIEF DESCRIPTION OF THE DRAWINGS

Two embodiments of the invention will now be described, by way of example, with reference to the accompanying drawings of which

FIG. 3 is a block diagram of a preferred processing apparatus in accordance with the invention;

FIG. 4 is a block diagram of an array of processing elements forming part of the apparatus of FIG. 3;

FIG. 6 is a block diagram of a main control unit forming part of the apparatus of FIG. 3.

DESCRIPTION OF THE PREFERRED EMBODIMENTS

Figure 1:
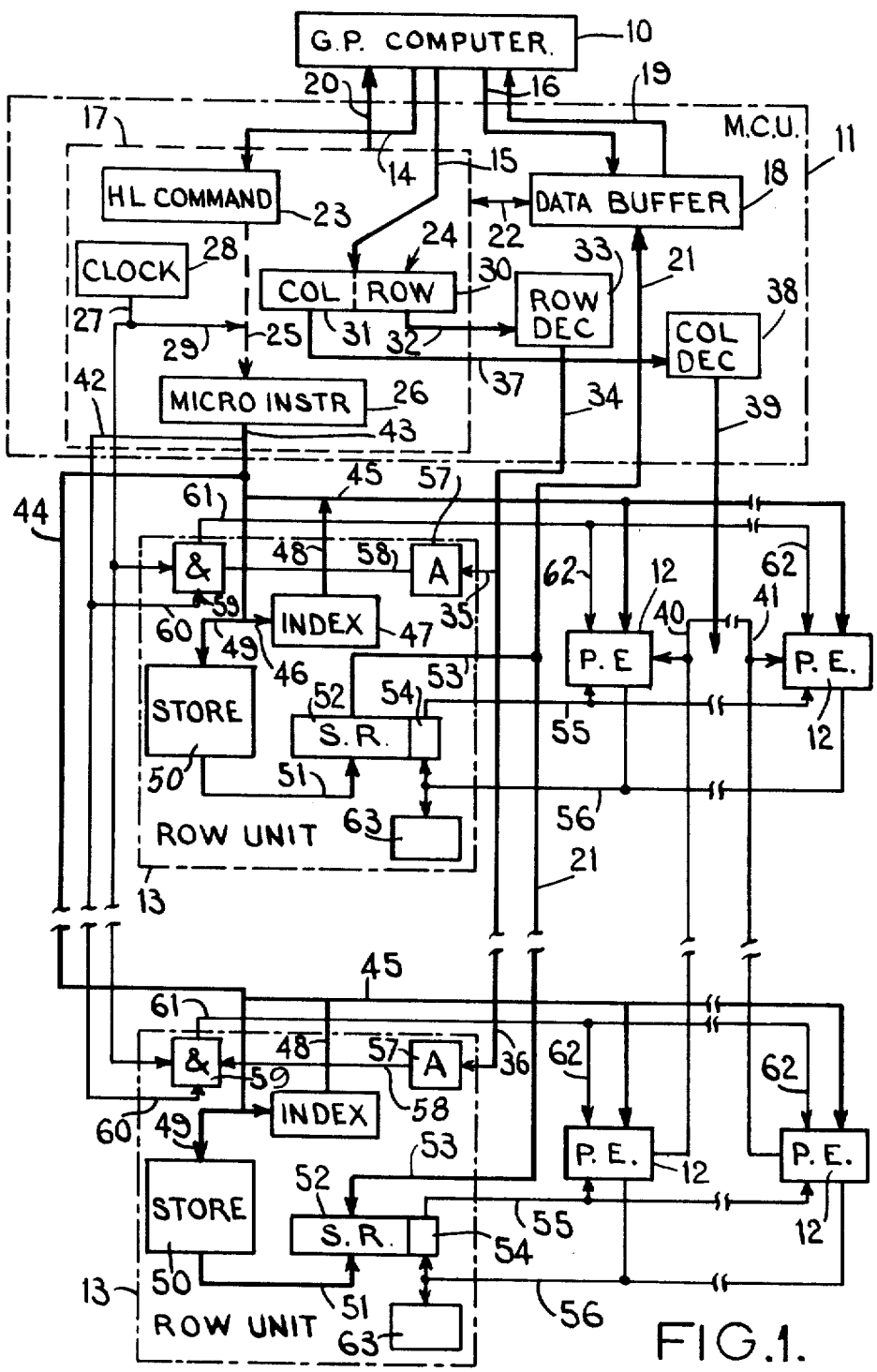
FIG. 1 is a block diagram of a first processing apparatus in accordance with the invention.

FIG. 1 shows a general purpose computer 10 in two-way communication with an array processor having a main control unit 11, a plurality processing elements 12 each operative in bit serial mode, and a plurality of row units 13 via which access is established between the main control unit 11 and different rows of the processing elements 12. The rows of processing elements 12 and their associated row units 13 are, in fact, arranged in layers only one of which is indicated in FIG. 1. A typical total configuration might comprise 128 row units with a maximum of 64 processing elements in each row. Thus, a two-layer arrangement would have, for each layer, 64 row units with 64 processing elements in each row.

The general purpose computer 10 will supply both high level commands and data, and will also be able to specify which of the processing elements are to be active or inactive at any one time. Three multibit communications 14, 15 and 16 are indicated for high level commands, processing element addresses, and data, respectively. The command communication 14 and the address communication 15 are shown extending to a control section 17 which is microprogrammed, and the data path is shown extending to a buffer 18 (a register built up of a series of bistables, such as is conventional to hold data to accommodate differences in timing controls). A data return 19 is shown from the buffer 18 to the general purpose computer 10, and another communication 20 is shown from the control section 17 to the general purpose computer 10 to indicate the additional need for information transfer in connection with instruction sending/fetching, including program branching in the general purpose computer 10.

The data buffer 18 is also shown with a multiline bidirectional path 21 for data transfer to and from the processing elements of the array as will be described. A further bidirectional arrow 22 is shown between the data buffer 18 and the control section 17 to indicate that transfer of data to and from the buffer is under control of the microprogram of the control section 17. It has been found convenient for the data buffer and the paths to and from it to be eight bits wide, especially where the general purpose computer is organised with 8-bit bytes.

The lines 14 and 15 are shown extending to registers 23 and 24, respectively. The register 23 serves to hold the current high level command for translation into microcode. This translation is conventional and will involve addressing a microprogram store which stores, at successive addresses, sequences of microinstructions constituting routines equivalent to high level commands. This store will normally be sequentially addressed by an address counter. The stored routines may be made up of subroutines similarly stored and to which jumps may or may not be required depending on whether predetermined conditions are met. Some arithmetic functions, e.g. comparison, indexing, etc. will be provided. The control section 17 is thus a conventional system for producing microcode from higher level commands and details of the translation functions are well known; see for example the documents referred to herein in describing the microprogram control unit of the second embodiment. In the interests of clarity of the drawing, therefore, a dashed line 25 only is shown extending directly from the high level command register 23 to a microinstruction register 26 that will successively contain actual microinstructions to be executed. Preferably, the microinstruction register 26 will form the output of a buffer that can contain several microinstructions at the same time so as to allow operations exclusively concerning the main control unit 11 or the general purpose computer 10 to be done concurrently with operations of the processing elements 12 alone. An output line 27 from a clock 28 is shown extended along branch 29 to the dashed line 25 to indicate timing control. The clock output 27 is also shown extending out of the main control unit 11 for use in controlling activity of the processing elements 12.

The address register 24 is, in reality, two registers, or sections thereof, one of which (30) can select a row unit and the other of which (31) can select corresponding processing elements one from each row. The address register 24 is shown inside the control section as its operations are timed in accordance with the dictates of the microprogram.

The address register section 30 has its stage outputs taken in parallel, see line 32, to a decoder 33 operative to convert a binary valued input into a unique one-out-of-$n$ outputs where $n$ represents the number of row units 13. The decoder outputs are indicated together at 34 with individual ones 35 and 36 shown extending to the first and last of the row units as shown in FIG. 1. The address register section 31 also supplies its stage outputs in parallel, see line 37, to a decoder 38 operative to convert a binary input into a unique one-out-of-$m$ outputs where m represents the number of processing elements 12 in a row. Decoders for performing the functions of the row decoder 33 and column decoder 38 are well known - see for example Pulse, Digital and Switching Waveforms by J. Millman and H. Taub, published by the McGraw-Hill Book Company, 1965, pages 351 and 352. Suitable examples are available as commercial integrated circuits, for example, the Texas Instruments Incorporated 74138. The $m$ decoder outputs are indicated at 39 with individual ones 40 and 41 shown extending to the first and last, respectively, of the processing elements 12 in every row. The decoder outputs 39 therefore effect a selection of corresponding processing elements in every row and so are readily considered as column selectors.

Conveniently, the lines 35 and 36 will be branched to select corresponding row units in each layer, and the lines 40 and 41 will also serve corresponding columns of processing elements in each layer. The selection of layers to be active is effected by lines extending from the main control unit 11, one (42) of these lines being shown in FIG. 1 as being energised from the output 43 of the microinstruction register 26.

The output 43 of the microinstruction register is shown as a single thick line branched, as will be described, to several different parts of the array regardless of whether command or data, particularly addresses, is concerned. This is to avoid cluttering the drawing unnecessarily. The use of decoding logic on the command parts for certain instructions, perhaps including layer activation/deactivation, is, as is to be expected, conventional. In general the microinstruction register outputs will be concerned with issuing strings of instructions for controlling the processing elements 12, e.g. a computing function which can include testing for particular conditions; transferring data between a column of processing elements 12 to the associated row units 13; transferring data between the buffer 18 and the row units; changing the state of the row units; and internal main control unit operations. The ensuing description, and the branching of the microinstruction register output 43 that is shown in FIG. 1, are concerned with the above mentioned operations other than internal main control unit actions. The line 44 shows the microinstruction register output 43 taken to all of the row units 13.

Figure 2:
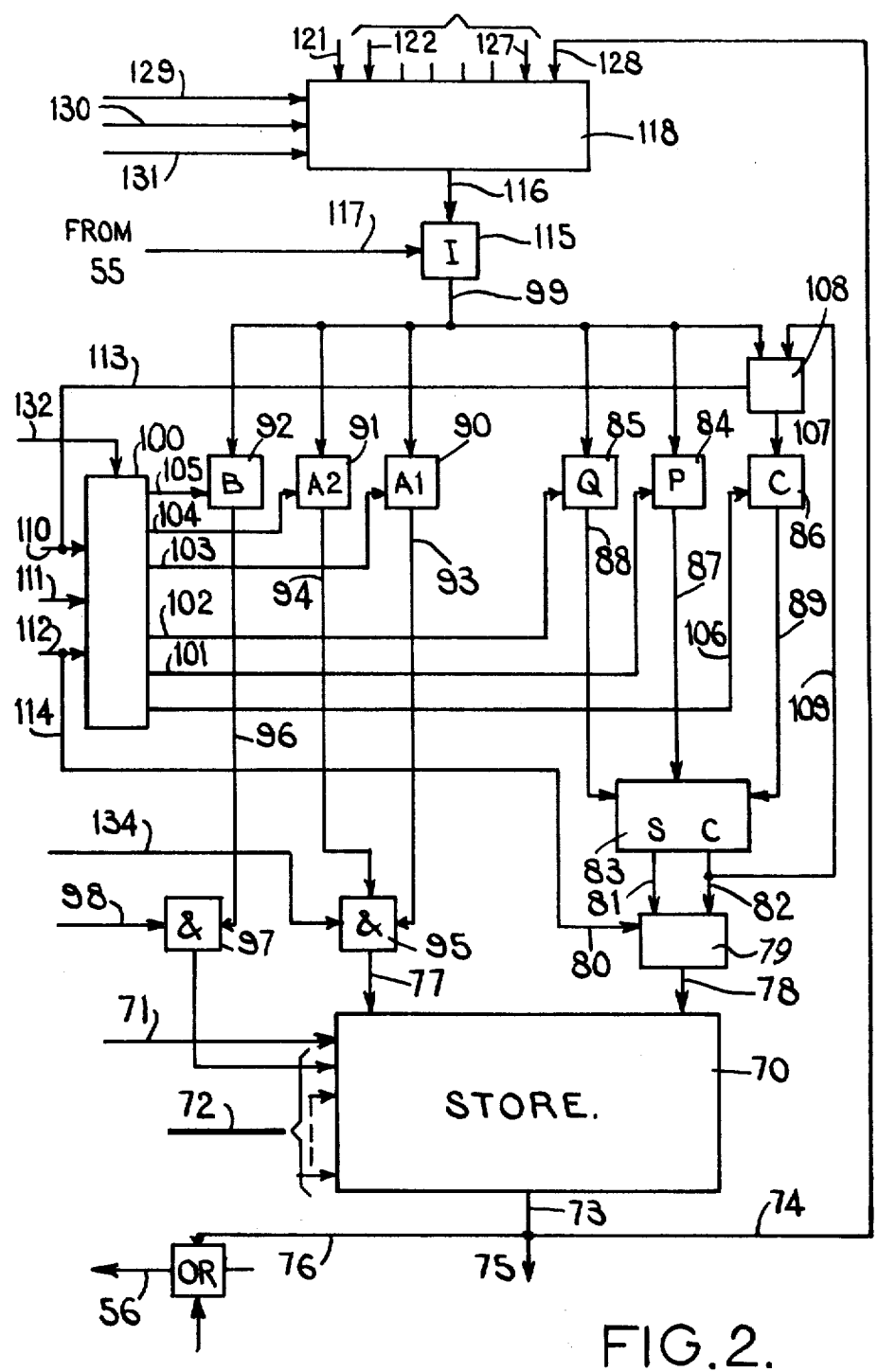
FIG. 2 is a block diagram of a processing element forming part of the apparatus of FIG. 1.

First branches 45 of the microinstruction register output are shown extending to all of the processing elements 12 associated with the row units 13 and these correspond to the issuing of commands to the processing elements per se as will be best understood from the description of FIG. 2.

Several branches 46 of the output 43 are each shown extending to an index register 47 within each row unit 13. These index registers 47 are used for indexing addresses within the processing elements 12. The output 48 of each index register 47 is thus shown extending to the first branches 45 to indicate their use in controlling the individual processing elements 12.

Third branches 49 of the output 43 are each shown extending to a store 50 within each of the row units 13. These stores 50 each serve to store information, such as constants, common to all or most of the processing elements 12 associated with the particular row concerned. A branch 49 serves to address the corresponding store 50 which will then provide an output 51 in parallel to a register 52 shown in the drawing as a shift register.

The register 52 also serves in the transfer of data to and from the data buffer 18 over branches 53 from the path 21. For such transfer the registers 52 are loaded and unloaded in parallel. For transfer of data to the processing elements 12, the contents of registers 52 are shifted rightwards once for each clock pulse so that data bits appear sequentially in the right-most register stage 54 from which they are available over line 55 to each processing element 12 of the corresponding row. This, of course, is to suit the bit-serial mode of the processing elements. Transfer of data from the processing elements 12 involves the reverse operations, namely sequential appearance over line 56 of bits in the right-most stage 54 and successive shifting of the register contents to the left. The fact that bit significance of data to and from the processing element 12 will be reversed on path 21 can be readily prevented by software. Alternatively, separate read and write paths can be provided, or, preferably, the register 52 can be embodied as a static register rather than a shift register with bit selection logic on its outputs for communication with the processing elements 12.

It is, of course, necessary to specify which ones of the row units 13 are to be active at any one time and this is done by the outputs 34 of the row decoder 33 mentioned above. These outputs, shown individually at 35 and 36, each extend to a different activity representing devices 57, one in each row unit. These devices 57 will be two state devices, either bistable or monostable as convenient, and their outputs 58 are each shown connected to one input of an AND gate 59 in each row unit. A second enabling input 60 of the AND gate 50 is energised according to the state of the layer activity control line 42. When both of these AND gate inputs are enabled, clock pulses from the line 27 will be passed to the AND gate output 61, which is shown feeding clock input circuit branches 62 of the processing elements 12. In this way, the activity of all of the processing elements 12 of a particular row is controlled. Normally it is expected that the AND gate outputs 61 will also provide clock pulses to the corresponding row unit itself.

Each row unit 13 is also shown as including a one bit register 63 fed from the data output of the processing elements 12 associated with that row unit. This register 63 is mainly intended for use in a parallel, fast store mode of operation of the array and will normally comprise a unique stage of an $n$ stage register as will be subsequently described.

Each of the processing elements 12 has been indicated as having six nearest neighbor inputs 122–127 thereby allowing communication with two other layers. It will be useful, for purposes such as meteorology, to be able to vary the layer structure of the array, e.g. to be able to choose between 8, 4, 2 or even one layer with different numbers of processing elements in each layer depending on the number of layers. To do this it will be necessary to provide alternative connections to row units as desired for a particular structure. It is also desirable to avoid excessive variations in cable lengths between and among the processing elements so that an appropriate physical arrangement is required. One such arrangement would have the processing elements of the shortest desired row (as required for the largest number of layers) connected serially via their common input/output lines 45, 55, 61, 56 in U-paths so that the ends of these lines are physically close together. Such "folded" row groups of elements are then physically positioned with consecutive ones corresponding to, and interconnectable to form, larger rows of other configurations. A physical disposition of the processing elements 12 so as to provide the above U-path configurations relative to columns as well as rows would be advantageous.

One development of the scheme shown in FIGS. 1 and 2 that would bring advantageous flexibility and increased processing power, is to provide column units similar to the row units 13 for feeding information to and from columns of the processing elements 12.

Details of the organisation of one of the processing elements 12 will now be given with reference to FIG. 2. A store 70 is provided which is bit organised and is enabled for operation over line 71 by the appropriate output of the column select decoder 38. Once enabled it is possible to read a bit from the store 70 according to the address on a group of lines 72. Bits read from the store will appear at the store output 73 from which they are available either to the inputs of the same (over line 74) and neighboring (line 75) processing elements, or as a processing element data output on line 76 which connects with line 56 of FIG. 1. Writing to the store 70 further requires energisation of a write enable line 77, when a bit on a data input line 78 will be written to the address specified by the lines 72.

Some of the lines 72 come from the index register 47 of the corresponding row unit 13, the other being part of the output 43 from the microinstruction register 26. The most significant bit line is capable of modification as will be described.

Bits to be written to the store 70 are provided, in accordance with energisation of line 80, by a multiplexor 79 connected to receive the sum 81 and carry 82 outputs of a full adder 83. Such multiplexors are obtainable as commercial integrated circuits. For example, one of the four 2-to-1 line selectors of a Texas Instruments Incorporated 74157 may be used. The adder is operative on the contents of P and Q operand registers 84 and 85 and a carry register 86 via their outputs 87, 88 and 89, respectively.

Three other registers 90, 91 and 92 are provided. Two of them 90 and 91, are activity control registers and both have to be set to a predetermined condition before a processing element can have its store written. To this end both of these activity control registers 90 and 91 have their outputs 93 and 94 connected to and AND gate 95 whose output serves the write enable line 77. In general it is intended that one of the activity control registers should be used by the microprogram and the other be available to a programmer.

The last register 92, is intended to be used as a modifier register for store addresses so as to give an exercisable option on which half of the store will be addressed. The output 96 of the register 92 is accordingly taken to an AND gate 97 which also receives the most significant store address bit on line 98.

The registers 84, 85, 90 to 92 are all loaded in the same way from a single line 99 according to which one of the registers is enabled by a decoder 100 over decoder outputs 101 to 105. An example of a suitable commercially available integrated circuit is the Texas Instruments Incorporated 74138 already mentioned. The function of the decoder 100 is to distribute clock pulses which it receives on a line 132 to the selected outputs 101 to 105 to clock data into the corresponding registers. The decoder 100 has a further output 106 for selectively enabling the carry register 86 to receive a bit from line 107 representing operation of a multiplexor 108 relative to the line 99 and line 109 from the carry output of the adder 83. The decoder 100 energises its outputs selectively according to the states of three input lines 110, 111, 112 carrying bits of the microinstruction. Two of these lines 110 and 112 serve dual purposes (for register loading and store writing) and branches 113 and 114 thereof supply the control lines of the multiplexors 108 and 79.

The common register supply line 99 is itself energised from the output of an inverter 115 according to the states of its input 116 and control line 117. The inverter input 116 is supplied by a multiplexor 118 shown as having eight inputs 121 to 128 any individual one of which can be selected according to the states of three input selection bits on lines 129, 130 and 131.

Some of the multiplexor inputs are connected to the store outputs of the nearest neighbouring processing elements, namely the four nearest neighbours in the same layer, i.e. corresponding ones in the adjacent rows and columns, and the corresponding element in each adjacent layer. Six inputs 122 to 127 are thus shown for this purpose, though elements in top and bottom layers would only require five and one preferred embodiment is contemplated with two layers only. Another of the multiplexor inputs, 128, is shown connected to the store output of the same processing element.

The remaining multiplexor input, 121, is used for data input operations. A continuous binary zero representation is applied to the input 121 and the binary data bits to be entered into a selected register of the processing element are applied from the row unit register 52 to the inverter control line 117. Each processing element 12 has two distinct types of operations one of which concerns loading of the registers 84 to 86, 90 to 92, and the other of which concerns writing to the store 70. In register loading, microinstruction bits on lines 129 to 131 will select one of the multiplexor inputs 121 to 128, control or data signals on line 117 will produce the desired register input, the decoder 100 will be enabled by clock pulses on line 132, and microinstruction bits on lines 110 to 112 will select the appropriate register to receive the selected input. It will be noted that loading of the carry register 86 is either from the adder carry output over line 109 or from the selected multiplexor input via the inverter 115 and line 99 depending on the value of the bit on line 110 thereby allowing initial conditions to be set as well as normal or modulo- type arithmetic.

Writing to the store 70 is done at an address specified by the lines 72, the sum or carry output of the adder 83 is selected via line 114 and multiplexor 79, and AND gate 95 will be completely enabled by the activity register outputs 93 and 94, and a write-to-store clock signal on line 134.

It is only necessary to be able to prohibit write-to-store operations in order to maintain the integrity of each processing element by preventing unwanted alterations to its store contents when it is supposed to be inactive. It is therefore possible to have separate clocking of register loading and store writing operations and to gate only the write clock signals according to row selection criteria.

A further possibility, giving control by rows, and one which is consistent with reducing to a minimum, inputs to a group of the processing elements that are physically packaged together, is for both clock signals (132 and 134) to be globally applied without gating and for the row select lines (117) to be applied indirectly via the row units to inverter control line 117 during write operations and to extend a branch therefrom to a further input on the AND gate 95. Then, only on coincidence of both a write clock pulse on line 134 and a row select signal will writing-to-store be permitted and this will not affect register loading operations on clock pulses over line 132 as, then, no write clock pulse will occur.

It is possible to extend the store address modification feature by introducing at least one more modification modification feature (B) register. This possibility is attractive as the three inputs to the decoder 100 are inherently capable of identifying more than the six registers 84 to 86 and 90 to 92. A preferred scheme using such extended modification would be to have the line 98 control a pair of multiplexors each of which received both a unique address bit and an output of a different one of the modification registers so that a choice could be made between the modification register contents and bits of the actual received store address.

The processor is intended to be fabricated using units made by integrated circuit semiconductor techniques. The store access speed of such a construction is sufficient to justify the particular simplified configuration shown in FIG. 2 for which no specific accummulator register is provided. Instead, all adder results are put into the store and retrieved therefrom whenever they are to be input again to the registers.

As indicated herein the processing elements are intended for bit serial operation so that all the registers are only one bit wide and words will be stored in and extracted from the store a bit at a time from successive addresses.

It is anticipated that, at least in some embodiments, each processing element will represent a premium of not more than 50% on the cost of semiconductor storage per se of the same capacity. It is therefor feasible to use the array as fast storage at times when it is not performing a function requiring its specialised serial processing facilities. Then, each row provides a different bit of the same data word, i.e. up to 128 bits wide for single layer organisation of the example given. A bit will be located in the same column and bit address of each row. The main data buffer will not be used. Instead, the register stages 63 will serve as both input and output registers. The row activity bits can be used to mask any combination of bits for either reading or writing. A write operation is readily achieved using two microinstructions, one to route the input data to the P registers 84 of the processing elements, and the other to pass the sum output 81 of the full adder 83 to the selected store address (A), the column address register 31 at that time also containing the column address, (AA). A read operation involves only a store read at the appropriate address (A), the column address register 31 again containing the column address (AA).

Use can also be made of the computing facilities, for example to test numbers for equality. Two numbers can be compared as follows. With, the column address (AA) of one number in the column register, the bits of the word concerned are extracted from appropriate addresses (A) in the processing element stores and put in the data register 63. The data register contents are then gated to the P registers 84 of all of the processing elements. The bit address (B) of other word to be compared will be applied to all of the processing element stores and their contents loaded into the corresponding Q registers 85. Binary 1 will be loaded into all of the carry registers. Then, the adder sum output will be fed to working space in the stores of the processing elements of only that column of processing elements (BB) to which the second word corresponds (the value BB then being in the column register). Lastly, the contents of the working space of the particular column are read out and will be all binary 1 for equality as detected by AND gates.

If two words to be compared are in the same or adjacent columns of processing elements (i.e./AA/-/BB/ = 0 or 1) the first word can be loaded to the P registers 84 in one microinstruction instead of the two indicated above. If the adder sum output is stored to the processing element stores of all columns, many comparisons can be done in parallel so long as they concern words that are in columns whose addresses differ by the same value of +1−1, or 0. Then, the final instruction for reading the stores will be used successively on the columns of interest, or a single global read instruction can test if every pair of numbers is equal, with or without masking.

The comparison of a set of numbers with a broadcast number is also straight forward, again with or without masking. Other Boolean function can also be generated between pairs of words in the so-called fast store mode.

Arithmetic operations involving ripple-carry can be performed if a multiplexor is included in the carry input 89 to the adder 83 of each processing element. Such a multiplexor would receive the output of the carry register 86 and the carry output 82 of the adder of the corresponding processing element in an adjacent row.

If only a two layer option is to be allowed in the serial mode of operation, a slower method of performing the carry for parallel addition would be to use the spare one of the six nearest neighbor inputs 122–127 for the carry function.

The overall arrangement described is well suited to integrated circuit semiconductor techniques for its construction. Using standard TTL logic with two 1024 bit bipolar stores per processing element, each processing element would take approximately 6.5 standard integrated circuits. Some circuits, such as the decoder 100, could be shared by more than one element. Using MSI techniques for special packages, the processor logic, apart from stores and routing multiplexors, of two processing elements could be integrated into one chip having eighteen pins. This would reduce the number of chips per processing element to less than 4 and the use of LSI could go even further.

A second, preferred apparatus in accordance with the invention will now be described with reference to FIGS. 3 to 6 of the accompanying drawings.

Referring to FIG. 3, the apparatus comprises a parent computer 200, an array 201 of processing elements, and a main control unit 202 which supervises the operation of the array. The parent computer 200 is a known, commercially available, general purpose sequential computer such as the International Computers Limited System 4-72 and will not be described in detail herein. Briefly, however, it comprises a central processing unit 203 having a store control section 204, and a main store 205 connected to the store control 204 by a 2-way highway (36 wires for each direction). The overall program for the system resides in the computer 200, which issues high-level instructions to the main control unit 202 for execution, as will be described below. The array 201 and its control unit 202 thus act as a peripheral of the parent computer. In addition, a two-way connection 206 is provided between the array 201 and store control 204, so as to allow direct transfer of data between the central processing unit 203 and the array. This permits the array to be used, in effect, as an extension of the main store 205 of the parent computer, the array appearing exactly like another block of storage to the store control 204.

Referring to FIG. 4, the array 201 comprises a rectangular network of processing elements PE arranged in rows and columns. In this particular embodiment, the array contains 72 × 128 elements, arranged in 72 rows and 128 columns, the number of rows (72) being chosen since it is an integral multiple of the store highway width (36) of the parent computer. Each element (apart from those on the edges of the array) has a two-way interconnection with each of four neighbouring elements, these elements being referred to as the north, east, south and west (N, E, S, W) neighbours. The E-W interconnections between the 64th and 65th element in each row are selectively disconnectable by means of a set of switches 317 (FIG. 6) under program control, so that the array can either be configured as a single 72 × 128 plane or as two 72 × 64 planes. Each element also has a two-way interconnection with a fifth "neighbouring" element, half a row away in the same row. For example, if there are 128 elements in each row, the first element in each row is connected to the 65th, and so on. Thus, the elements may be regarded as being connected in a three-dimensional network consisting of two 72 × 64 planes, and for this reason the fifth connection is referred to as the vertical (V) connection.

The elements at the edges of the array or of each plane are selectively interconnectable by means of the switches 317, so as to produce a number of different array (or plane) geometries. There are four possible types of edge connection for either rows or columns.
 a. The ends of each row (or column) are not connected to other processing elements.
 b. The ends of each row (or column) are connected together to form a circle.
 c. The last element in each row (or column) is connected to the first element in the next row (or column) so that the elements form a long chain.
 d. As (c), but the last element in the chain is connected back to the first element so as to form a large circle.

Since there are four possible types of edge connection for both rows and columns, and a choice between one and two planes, the total number of possible geometries is 4 × 4 × 2 = 32.

It should be emphasised that FIG. 4 is only intended to show the electrical interconnections between the elements and does not represent the actual physical positions of the elements. In the preferred embodiment, the array is physically folded in two directions so as to bring the left-hand edge as viewed in the drawing adjacent the right-hand edge and to bring the top edge adjacent the bottom edge. The effect of this is to ensure that the physical distances between the elements at electrically opposite ends of the rows and columns are substantially equal to those between adjacent elements in the rows and columns. Thus, the selective interconnections between the array edges do not introduce any undue inequalities in time delays between the elements.

The array is operable in two modes. In a first mode, referred to as the array mode, a word of data is held in a single processing element and is operated upon in bit-serial manner by a single element. Thus, in this mode, as many data streams as there are processors can be operated upon concurrently. In a second mode, referred to as the main store mode, a dataword is spread out along a column of the array, one bit to a processing element. As its names implies, this mode is used when the array is acting as an extension of the parent computer's main store. In addition, this mode is used to hold the microprogram for the array (see below) and is used for input/output of data to and from the array. Arithmetic is also possible in this mode, the bits of a word being operated upon in parallel by respective processing elements. Thus, the absolute speed of arithmetic is higher than in the array mode, but fewer data streams can be processed concurrently. As will be explained, special "ripple carry" paths are provided for conveying "carry" bits between the elements when performing arithmetic operations in the main store mode.

It should be noted that there is no formal distinction between these two modes as far as a processing element is concerned: that is to say, there is a single instruction set, and no "mode bit." Moreover, at any given time, some data may be stored in one mode and other data in the other mode.

Figure 5:
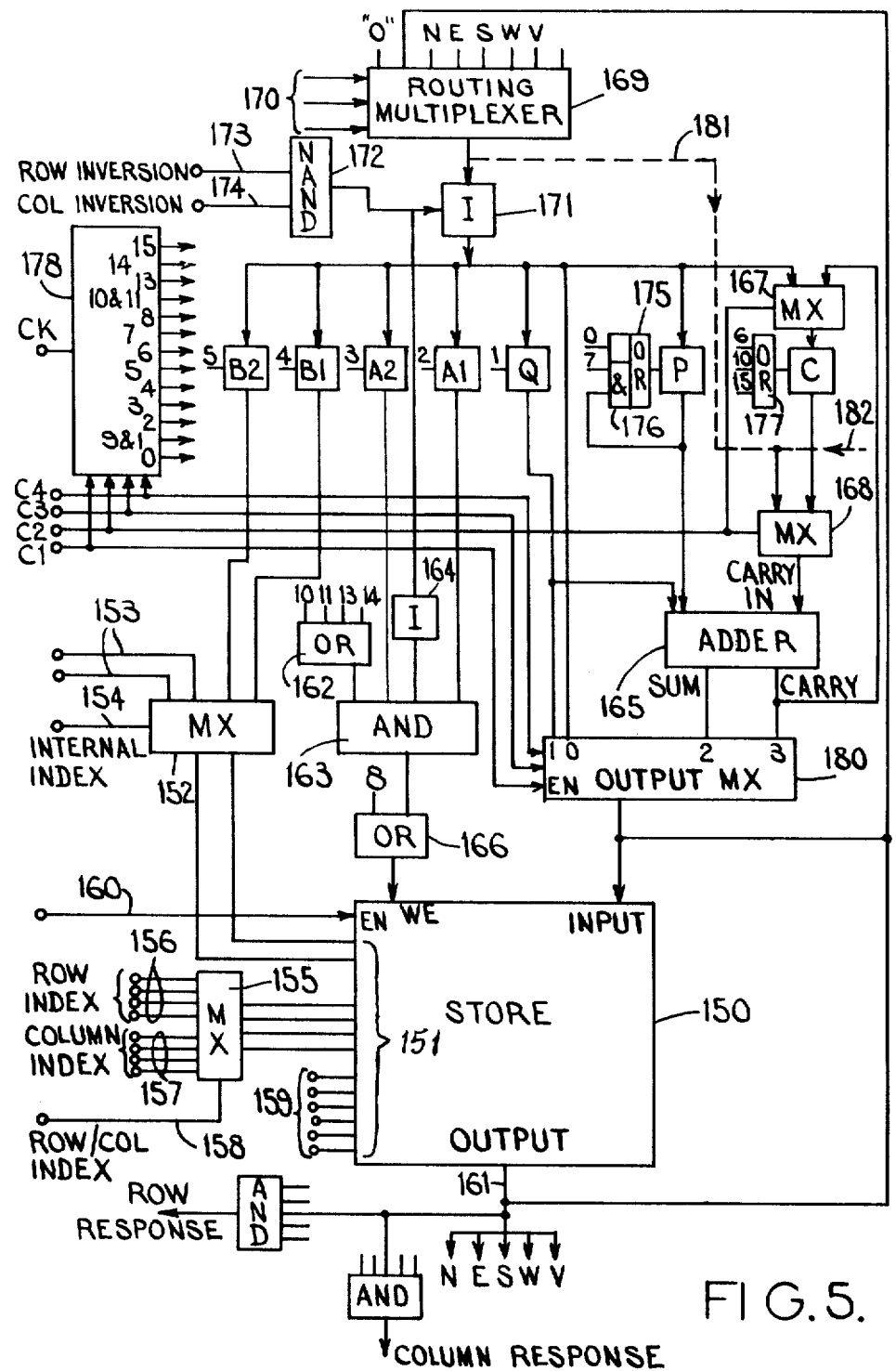
FIG. 5 is a block diagram of one of the processing elements of FIG. 4.

Referring now to FIG. 5, this shows one of the processing elements of the array. The element includes a store 150 containing, in this embodiment, 4096 bits each of which is individually addressable by means of a 12-bit address applied to its address inputs 151. The two most significant address bits are derived from a multiplexer 152 which selects these bits either from two input lines 153 or from the outputs of two single bit registers B1 and B2 in accordance with the value of a binary input on control line 154. This provides the element with an internal indexing facility for two bits of the address. The next four most significant address bits are derived from a multiplexer 155 which selects these bits either from a first group 156, or from a second group 157, of four input lines in accordance with the value of a binary input on control line 158. An example of a suitable commercially available integrated circuit for the multiplexer 155 is the quad 2-to-1 line selector Texas Instruments Incorporated 74157 mentioned previously. This provides a facility for indexing these four address bits of the memories of the array either by row or column, as will be described. The remaining six address bits are derived from input lines 159. The store 150 is enabled for operation by a binary 1 on input line 160 applied to an enable terminal EN, and this causes the bit identified by the address on inputs 151 to be read out on to an output terminal 161. If it is required to write into the store, a binary 1 must also be applied to a write enable terminal WE.

In addition to the registers B1 and B2, the processing element also includes further one-bit registers C, P, Q, A1 and A2. The contents of A1 and A2 are referred to as activity bits and are settable under program control to define which elements of the array are to be permitted to have their stores written into, as will be described.

The P and Q registers serve as input registers to a single-bit full adder 165 having sum and carry outputs, while register C serves as a carry register for the adder being connected to the carry output of the adder by a multiplexer 167 and to the carry input of the adder by a multiplexer 168.

The processing element also includes a routing multiplexer 169 having eight input terminals, any one of which can be selected in accordance with a three-bit routing address applied to the multiplexer on lines 170. An example of a suitable commercially available integrated circuit is the Texas Instruments Incorporated 8-bit data selector 74151. One of the input terminals is connected to receive a steady binary 0, the purpose of which will be explained later. Another of these terminals is connected to the output 161 of the store 150 of the same element. Another five of these terminals are connected to the outputs of the stores of the five neighbouring elements (N, E, S, W and V) of the array, so as to provide the interconnections between neighbouring elements described above with reference to FIG. 4. The remaining terminal is spare.

The output from the multiplexer 169 is applied via a controllable inverter 171 (exclusive-OR gate) to the inputs of the registers P, Q, A1, A2, B1, B2, and also to the register C via the multiplexer 167. This inverter 171 is controlled by the output of a NAND gate 172 having two input lines 173 and 174. Each of the registers has a control input which, when a binary 1 is applied to it, causes data to be written into the register from the inverter 171. Writing of data into the registers is controlled by a clock decoder 178 which receives from the main control unit clock signals over a line CK and a four-bit command code on four lines C1–C4. The decoder produces a binary 1 output, at each clock pulse, on one of thirteen output terminals, according to the value of the command code, as indicated by the numbers adjacent the output terminals in the drawing. For example, a binary 1 is produced on terminal 0 when the command code is 0000 and on terminal 9 and 1 when the code is 1001 or 0001. The outputs of the clock decoder are applied to correspondingly numbered inputs as shown in the drawing.

The control input of register P is connected to an OR gate 175, one input of which receives the clock decoder output 0 and the other of which is connected to an AND gate 176. One input of this AND gate receives the clock decoder output 7 and the other is connected to the output of the register P. Thus, a command code 0000 will cause data to be clocked into the register P, while a command code 0111 will cause data to be clocked into register P only if the contents of P are already equal to one. This latter command is useful for performing associative comparisons when the array is operated in the main store mode.

The control input of register C is connected to an OR gate 177 whose inputs are connected to the clock decoder outputs 6, 10 and 15 to cause data to be clocked into this register for any of the corresponding command codes. The control inputs of registers Q, A1, A2, B1 and B2 are connected to the clock decoder outputs 1–5 respectively.

Clock decoder outputs 10, 11, 13 and 14 are applied to an OR gate 162 the output of which is applied to one input of an AND gate 163. The other inputs of the AND gate 163 are fed from the A1 and A2 registers, and from an inverter 164, which in turn is fed from the output of NAND gate 172. The output of AND gate 163 is applied to one input of an OR gate 166, the other input of which is connected to clock decoder output 8, and the output of OR gate 188 is applied to the write enable terminal WE of the store 150. Thus, it will be seen that the store is only enabled for writing if either a. One of the clock decoder outputs 10, 11, 13 or 14 is present, both the activity bits A1 or A2 are set and the output for NAND gate 172 is 0, or b. Clock decoder output 8 is present.

Thus, as mentioned above, the activity bits provide a means for selecting which elements are permitted to have their stores written into. In addition, it will be seen that a "veto" is placed on writing to the store when the NAND gate 172 output is a binary 1. The activity bits and the veto are both overridden, however, by the clock decoder output 8.

The processing element also includes an output multiplexer 180, for selecting data for writing into the store 150, from one of four inputs, labelled 0–3. The multiplexer is controlled by the code bits on C1, C3 and C4, being enabled when C1=1 and selecting one of its four inputs in accordance with the binary number on lines C3 and C4. For example, if C3=1 and C4=0, input 2 is selected. Input 0 of the multiplexer 180 is connected directly to the output of the inverter 171, and permits data to be written directly into the store 150 without passing through any of the registers. Input 1 is connected to the output of the register Q, while inputs 2 and 3 are connected respectively to the sum and carry outputs of the adder 164.

The output of the multiplexer 180 is also connected directly to the store output 161, and hence to neighbouring processing elements as described above. This permits data to be routed directly between elements without passing through the store. The outputs of both the store 150 and the output multiplexer 180 are "tristate" or "open collector", which means the output of each of these is indeterminate when not enabled, so that connecting these outputs together does not lead to any conflict, provided only one is enabled at any given time.

The signal on the line C2 also controls the two multiplexers 167 and 168 described above. Thus, when C2=0, the carry output of the adder 165 is connected to the input of the carry register C and the output of the carry register is connected to the carry input of the adder. This configuration is used for bit-serial addition of two numbers in the array mode of operation.

When, on the other hand C2=1, the adder carry input is connected by a special ripple carry path 181 directly to the output of the routing multiplexer 169 and can thus receive carry bits produced by the adder of the preceding element in the same column. (Alternatively, a special path 182 may be provided directly between the input of multiplexer 168 and the output multiplexer of the preceding element in the same column, this alternative being convenient if the neighbouring element has its adder formed on the same integrated-circuit chip as the element in question.) This configuration is used for bit-parallel addition of two numbers in the main store mode of operation, where each operand is stored in a column of the array, one bit per element, with the paths 181 (or 182) providing ripple carry between adjacent elements in a column.

The above description of the processing element is conveniently summarised by Table 1, which lists the command set of the processing element. For convenience, each command has been given a mnemonic name (P, Q, etc.).

Table 1

| Command | C1 | C2 | C3 | C4 | CK | Effect |
|---------|----|----|----|----|----|--------|
| P | 0 | 0 | 0 | 0 | 1 | Write into P. |
| Q | 0 | 0 | 0 | 1 | 1 | Write into Q. |
| A1 | 0 | 0 | 1 | 0 | 1 | Write into A1. |
| A2 | 0 | 0 | 1 | 1 | 1 | Write into A2. |
| B1 | 0 | 1 | 0 | 0 | 1 | Write into B1. |
| B2 | 0 | 1 | 0 | 1 | 1 | Write into B2. |
| C | 0 | 1 | 1 | 0 | 1 | Write into C. |
| PL | 0 | 1 | 1 | 1 | 1 | Associative comparison (write into P provided P=1). |
| DS | 1 | 0 | 0 | 0 | 1 | Write direct to store. |
| QR | 1 | 0 | 0 | 1 | 1 | Q applied to output for routing to neighbors' Q registers. |
| S | 1 | 0 | 1 | 0 | 1 | Sum output written into store. Clock C. |
| CS | 1 | 0 | 1 | 1 | 1 | Carry output written into store. Clock C. |
| QS | 1 | 1 | 0 | 1 | 1 | Q written into store. |
| RCS | 1 | 1 | 1 | 0 | 1 | Exclusive OR. |
| RCC | 1 | 1 | 1 | 1 | 1 | Ripple carry. |
| OUT | 0 | * | * | * | 0 | Output from store. |

Table 1-continued

| Command | C1 | C2 | C3 | C4 | CK | Effect |
|---------|----|----|----|----|----|--------|
| | 1 | * | 0 | 1 | 0 | Supplementary output commands. |
| | 1 | * | 1 | * | 0 | |

It should be noted that commands S, CS, QS, and RCS, all cause the OR gate 162 to be enabled, so as to permit writing to store, subject to control by the activity bits A1 and A2, and to the veto from NAND gate 172. Command DS causes OR gate 166 to be enabled to permit writing to store, and hence is not subject to activity bit control or to the veto.

Commands RCS and RCC require some explanation. Command RCC is the ripple carry command and is used for adding two numbers in the main store mode. Consider a column of processing elements, and assume that the P registers of the column contain the bits of one operand, and the Q registers those of the other operand. In addition, it is assumed that each element is connected to its northern neighbour by way of the ripple carry path 181 or 182. If now the command RCC is applied to the lines C1–C4, each adder 165 will perform the addition of the two bits in the associated P and Q registers and of the carry bit from its northern neighbour, and will pass the carry bit from this addition on to its southern neighbour. The clock pulse on line CK is delayed for this command, so as to permit the addition to "ripple" along the column of elements and to settle down to a stable state. When the clock pulse appears, clock decoder output 15 produces a 1, which causes the carry bits to be clocked into the respective carry registers C. The result of the addition can now be read from the sum outputs of the adders 165.

Command RCS is similar to the ripple carry command, but in this case the sum output of each adder is connected via the path 181 or 182 to the carry input of the next adder in the column. Thus, it will be seen that the sum output from the last adder in the column will settle down to a value equal to the modulo-2 sum of the contents of all the P and Q registers in the column. The clock pulse on CK is also delayed for this command, and causes the store to be enabled to permit this sum to be written into it. This command can be used, for example, to generate parity bits for words stored in the main store mode.

In use, each of the commands (except the commands RCC and QR) will be applied to the processing element in conjunction with a store address on lines 151 to specify the address of the bit in the store 150 into which or from which the data is to be written. In addition, the commands will be applied in conjunction with a routing address to the multiplexer 169 in order to specify the source of the data input to the inverter 171. The notation P(A,D) will be used to denote the command P applied in conjunction with the address A and the routing multiplexer address D (where D is either N,E,S,W or V), while the notation P(A) denotes that the routing multiplexer selects the output from the processing element's own store address A.

It will be appreciated that various microprogram sequences can readily be constructed from the above command set to cause the array to perform various operations as required. As an example, Table 2 lists the microprogram for fixed point serial addition of two numbers X and Y in the array mode. The microprogram is executed by all the elements in parallel and it is assumed that the operand X for each element is contained in the store of that element, while the operand Y is obtained from its eastern neighbour. It is also assumed that X has eighteen bits, stored in addresses X0, X1 ... X17 (in order of decreasing significance), that Y has more than 12 bits stored in addresses Y0, Y1 ... and that the most significant bit of Y is six places lower than that of X, so that Y0 is aligned with X6.

Table 2

C(Y12,E)
P(Y11,E)
Q(X17)
S(X17)
P(Y10,E)
Q(X16)
S(X16)
.
.
.
S(X6)
Q(X5)
S(X5)
Q(X4)
S(X4)
.
.
S(X1)
Q(X0)
S(X0)

Referring now to FIG. 6, this shows the main control unit 202 (FIG. 3) in greater detail.

The control unit includes a group of eight registers 300 each of which holds a number of bits equal to the number of processing elements in the major dimension of the array 201: in this case, 128 bits. Each of these registers is addressable and, when so addressed, can be connected either to a group of 72 row response lines 301, a group of 128 column response lines 302, a group of 128 column inversion lines 303 (via a multiplexer 304), or a group of 72 row inversion lines 305 (via a multiplexer 306).

Each row response line 301 is connected to an AND network 307 which receives outputs from the store output terminals 161 of a row of 128 j elements. Similarly, each column response line 302 is connected to an AND network 308 which receives outputs from the store output terminals 161 of a column of 72 elements. It will be seen that this provides the facility for reading data from the array either by rows or columns into any selected one of the registers 300.

Each of the column inversion lines 303 is connected to one input 174 of each NAND gate 172 (FIG. 5) in a column of the array. Similarly, each row inversion line 305 is connected to the other input 173 of each NAND gate 172 in a row of the array.

Referring again to FIG. 5, the row and column inversion lines have three functions. The first is to selectively invert data written into the element registers or store. This inversion may be performed by rows or columns as required.

The second function of the row and column inversion lines is to permit writing of data from the main control unit into the processing elements. In this case, the routing multiplexer 169 is set so as to apply the fixed value 0 to inverter 171 and this value, selectively inverted as required under control of the inversion lines, can then be written into any selected register of the element, or directly into the store under command DS.

The third function is a geometric control function for producing a veto on writing to selected ones of the element stores. Thus, if the output of the NAND gate 172 in any element is a 1, the output of inverter 164 will be 0 and the AND gate 163 will therefore be disabled, preventing writing to store for commands S, CS, QS and RCS. As already mentioned, this veto is not operative for the command DS since in that case the OR gate 166 is enabled by the decoder output 8. This is necessary since, as just mentioned, command DS may require the inversion lines to be used for data writing purposes, so that they are not then available for geometric control.

Referring again to FIG. 6, the last four of the main control unit registers 300 are referred to as the index registers and provide 128 four-bit index numbers. These index numbers are applied to respective columns of the array, one index number being fed to the four input lines 157 of each element of the corresponding column. The index numbers are also applied to respective rows of the array, one index number being fed to the four input lines 156 of each element of the corresponding row. It will be seen that this provides the facility for indexing four of the address bits applied to the stores 150 of the elements, either by rows or by columns.

The main control unit is also connected to the array by 128 column select lines 309, each of which is connected to the input lines 160 of each element in a column of the array. This provides the facility for enabling the stores 150 of a selected column of elements or, alternatively, enabling the stores of all or none of the elements in the array. In addition, the main control unit has a group of address lines 310 which are connected to the address inputs 153 and 159. of all the elements in the array, and a group of control lines 311, which are connected to the control inputs of all the elements in the array, namely the three routing multiplexer control lines 170, the four command lines C1–C4, and the index control lines 154 and 158. The control lines 311 also include two clock lines CK, one of which is connected to all the elements in the lower half of the array (i.e. the bottom 36 elements in each column) and the other to the top half of the array. Normally, both these clock lines are controlled in unison. However, in some circumstances (e.g. for writing to the array from the parent computer), only one clock line is enabled, so as to cause data to be written to only half the array. This permits two words (each of 32 bits plus 4 parity bits) to be stored in each column of the array.

The operation of the main control unit is supervised by a microprogram unit 312. Microprogram control is, of course, in itself well known in the art (see, for example A.C.M. Computing Surveys, Sept. 1969, Vol. 1, No. 3, page 139, and also U.S. Pat. Nos. 3,631,405, 3,654,617 and 3,673,575) and the structural details of the unit 312 will therefore not be described in detail, since they do not form any part of the present invention. Briefly, however, the unit 312 is arranged to receive high level instructions from the parent computer and to interpret these instructions into sequences of micro-instructions in accordance with a stored, alterable microprogram. In the present embodiment the microprogram is held in the stores 150 of the processing elements, in the main store mode, although in alternative embodiments of the invention the microprogram could be held in a special store within the control unit.

To initiate a sequence of micro-instructions, the parent computer first writes a control number into a control register 313, to specify the address within the array of the first instruction of the sequence, and then issues a start command on path 314. The control number consists of a first part, specifying the column of the array in which the instruction is located, and a second part, specifying the bit address of the instruction within the element stores. The first part is decoded by the microprogram unit to produce a signal on one of the column select lines 309 so as to enable the stores of the required column, while the second part is applied to the address lines 310 so as to address one bit in each store of the selected column. This causes the required micro-instruction to be read from the array over the row response lines 301 into an instruction buffer 315. Conveniently, two micro-instructions are held in each column of the array, necessitating a multiplexer (not shown) between the lines 301 and the buffer 315 for selecting between them. The microprogram unit then causes the micro-instruction in the buffer to be executed, by application of suitable signals to the column select lines 309, the address lines 310, the control lines 311, and to the registers 300 so as to apply these registers to the column and row inversion lines 303, 305 as required. The microprogram unit may also operate the multiplexers 304, 306 so as to apply a fixed binary value 0 or 1 to each row or column inversion line. In addition, the microprogram unit may cause data appearing on the row and column response lines 301, 302 to be written into selected ones of the registers 300.

Some micro-instructions specify operations within the main control unit itself. Thus, the microprogram unit may write data directly into the registers 300, or into a geometry control register 316. This letter register is a set of bistables each of which controls, according to its state, one of the switches of the interconnection of the elements, as described above. Furthermore, when the array geometry is such that the elements at the ends of rows or columns are unconnected, the microprogram unit may cause the contents of any one of the registers 300 to be applied to those elements in place of the N, E,S or W connection, as the case may be.

When the micro-instruction in the buffer 315 has been executed, the control number in the register 313 is incremented so as to fetch the next micro-instruction from the array into the buffer 315, which is then similarly executed. Normally, the control number is incremented by unity, but may be made to jump in response to a "jump" instruction in the buffer 315. The jump may be unconditional, or may be dependent upon the contents of one of the registers 300 which are examined by the microprogram unit 312. This sequence of instruction fetching and execution continues until a "stop" instruction appears in the buffer 315, whereupon the microprogram unit will send a response signal back to the parent computer over path 319 to indicate completion of the high-level instruction.

In a modification of the arrangement described above, the microprogram unit 312 may be provided with a random access memory capable of holding a number of micro-instructions (up to 16, say), which form a loop in the microprogram. The unit is arranged to respond to a special loop control instruction, to load a specified number of micro-instructions from the array into the random access memory, and to cause these instructions to be executed as a loop, a specified number of times. The loop control instruction may also specify that certain parts of the instructions in the random access memory are to be incremented by a specified amount each time they are executed. It will be seen that this modification is capable of reducing the length of the microprogram stored in the array, since each loop need only be stored once, and can also reduce the time required for fetching instructions from the array.

At any time during the execution of a high-level instruction, the parent computer may interrupt the main control unit, by applying an address to the microprogram unit 312, over path 320, along with an "enable" code on path 321. This causes the microprogram to be interrupted after completion of the current micro-instruction, so as to allow the parent computer to gain access to the array in the main store mode. The address on path 320 specifies the location of the word in the array to which the parent computer requires to gain access, and comprises of two parts: the first part specifies a particular column of elements, and is decoded by the microprogram unit so as to produce a signal on one of the column select lines 309; the second part specifies the address of a particular bit within each store of that column, and is applied to the address lines 310. In addition, the address contains an extra bit which specifies which half of a column the word is held in. It is assumed that the word length is 32 bits plus 4 parity bits, so that two words can be held in each column.

Data read from the array appears in parallel on the row response lines 301, and is applied to the 36 return lines of the path 206 by way of a multiplexer 322 which selects data from either the first or second half of the row response lines. This multiplexer is controlled by the extra bit mentioned above.

When data is to be written into the array, as specified by the "enable" code, the microprogram unit operates the multiplexer 306 so as to connect data on the 36 send lines of the path 206 to the row inversion lines 305. Each send line is connected to one of the first 36 row inversion lines and to the corresponding one of the second 36. For writing, the microprogram unit must also apply appropriate signals to the control lines 311 to permit writing from the row inversion lines 305 to the element stores: namely, the routing multiplexer address for selecting the fixed 0 input, the command code DS, and a clock pulse on one of the lines CK. Which half of the column the data is written into is determined by which of these lines is enabled, and this is determined by the extra bit of the address on lines 320. At the same time, the column inversion lines must all be set to binary 1 by means of the multiplexer 304.

The importance of the fact that the command DS is independent of the activity bits A1 and A2 can now be appreciated. If these bits were operative to inhibit writing to the store for the command DS, then before the computer could write to the array in the main store mode it would first of all have to set all these bits to 1 so as to permit the stores of all the elements to be enabled for writing. Moreover, the contents of the activity registers A1 and A2 would have to be preserved, so that, when the interrupt was completed, the array could be returned to the condition it was in before interruption.

In a modification of the preferred embodiment described above, the spare input terminal on the routing multiplexer 169 (FIG. 5) may be used to provide a sixth "neighbour" connection between processing elements, so as to form a three-dimensional network with more than two planes of processing elements. Alternatively, this spare input may be used to provide additional connections for routing data between elements in the main store mode so as to reduce the time taken for such data transfers. For example, a column of 72 processing elements 0–71 may be arranged to store two words, each having 32 data bits and 4 parity bits arranged as follows:

PE's 18 to 33 - L.S. data bits of words 1
PE's 38 to 53 . M.S. data bits of word 1
PE's 54 to 69 - L.S. data bits of word 2
PE's 2 to 17 - M.S. data bits of word 2.

With this arrangement of data, shifting and cyclic shifting of the data bits of the two words are facilitated by the following interconnections between the processing elements of the column:

PE 33 connected to PE 38
PE 53 connected to PE 18
PE 69 connected to PE 2
PE 17 connected to PE 54

Another modification which may be made is to arrange for the microprogram unit 312 (FIG. 6) to supply 12 address bits instead of eight, and for four of these bits to be added to the four row and column index bits before application to the processing elements.

In yet another modification, the main store unit 205 (FIG. 3) could be omitted, so that the array 201 becomes the only main store provided for the parent computer 200.

As in the case of the first embodiment of the invention, the processing elements are preferably constructed using integrated circuit semiconductor techniques. The processing logic, apart from the stores and routing multiplexers of two processing elements can be integrated on one chip, the store of each element can be formed from four standard memory chips, while the routing multiplexers can also be standard chips.

In conclusion, the preferred embodiment of the invention provides an array processing apparatus which is extremely flexible, as a result of the serial single-bit operation of the processing elements and the microprogramability of the main control unit. The simple design of the processing elements, and the fact that overall control resides in the parent computer, gives the array a very good performance/cost ratio, particularly if integrated circuit techniques are employed. Moreover, the array is readily accessible for use as main storage by the parent computer, which means that any memory space not being used by the array processor can be utilised by the parent as an extensioon of its own main store, thus improving the performance/cost ratio still further. Furthermore, the array can readily be operated to process data stored in the main store mode. Which mode the array is operated in will depend on the particular problem; in general, problems involving larger numbers of parallel data streams (over 1000, say) will use the array mode, those involving fewer parallel streams (between 10 and 1000, say) will use the main store mode. Another important feature of the preferred embodiment is the good intercommunication between the processing elements, in particular the vertical connections and the variable edge connections, which facilitates handling of data in both modes.

I claim:

1. Array processing apparatus comprising:
   a general purpose sequential computer;
   an array of interconnected processing elements each having:
      a multi-bit memory the individual bits of which are independently addressable,
      an arithmetic unit, connected to said multi-bit memory, which unit has at least two separate single-bit input channels, at least one single-bit output channel and arithmetic means for performing a binary operation on separate single bits input one by each of the said channels and outputting a bit representing the result of the said operation on the said output channel, and
      input means for receiving micro commands for controlling the operation of a processing element; and
   main control means for controlling the mode of operation of the processing elements and the operations performed by said processing elements including:
      means for receiving high-level instructions from the general-purpose sequential computer, a writable microprogram storage means,
      means for retrieving a sequence of microinstructions from a microprogram held in said writable storage means,
      means for deriving a plurality of microcommands from each retrieved microinstruction, and
      distribution means for distributing to the input means of each processing element at least some of the microcommands derived by the control means.

2. Apparatus according to claim 1, wherein said processing elements are arranged in rows and columns, including means interconnecting each processing element to the adjacent elements in its row and column to permit data transfer between them, the control means including means for controlling the said data transfer.

3. Apparatus according to claim 1, including means interconnecting each processing element with at least one further processing element to permit data transfer between them, the control means including means for controlling the last-mentioned data transfer.

4. Apparatus according to claim 2, wherein the processing elements are physically arranged to form pairs of elements at the opposite ends of each column, and row, and the control means includes switch means interconnecting each of the said pairs and permitting data transfer between them.

5. Apparatus according to claim 1, wherein the processing elements are arranged in rows and columns and the control means includes a plurality of registers each of which contains a number of bits equal to the greatest dimension of the array, means for connecting each register to the rows of the array to receive one output bit from or apply one output bit to each row, means for connecting each register to the columns of the array to receive one output bit from or apply one output bit to each column, and means for selecting the connection of each register to a row or column.

6. Apparatus as claimed in claim 1, wherein each processing element has a first and a second set of address inputs for addressing its memory, means connecting the first sets of inputs of all the processing elements to the control means to receive a common set of base addressing bits, and the control means includes a plurality of index registers equal in number to the number of inputs in each second set and each containing a number of bits equal to the number of elements in the greatest dimension of the aray, means for connecting each index register to supply a different one of its bits as an index bit to the same address input of the second set in all the elements in each different one of the rows of the array, means for connecting each index register to supply a different one of its bits as an index bit to the same address input of the second set in all the elements in each different one of the columns of the array, and means for selecting the connection of the index registers to the rows or columns.

7. Apparatus according to claim 1 wherein each processing element includes a plurality of single bit registers, a routing multiplexer for selecting a bit from the output of the memory of that element or from another one of said elements and applying that bit to the inputs of said single-bit registers, and a controllable inverter connected between the routing multiplexer and the single-bit registers and wherein the main control means has means for controlling the inverters in the elements of the array so as to produce inversion in selected ones of those inverters.

8. Apparatus according to claim 1, wherein the said microinstructions are obtained from the memories of the processing elements.

9. Apparatus according to claim 1, wherein said computer includes a central processing unit, a main store, and a multi-wire main store highway interconnecting the central processing unit to the main store, and wherein processing elements of the array are connectable to the main store highway to permit transfer of data between the array and the highway, thereby permitting the memories of the processing elements to be used as an extension of the main store of the computer.

10. Apparatus according to claim 9 wherein the elements are arranged in rows and columns, the rows of the array being connectable to respective wires of said highway, and the control means includes means for selecting a column of the array to permit parallel transfer of a multi-bit word between the selected column and the highway.

11. Apparatus according to claim 9 wherein the control means includes means for receiving interrupt signals from the computer to interrupt the execution of the high-level instruction currently being executed by the control means to allow transfer of data between the main store highway and the array, following which the control means continues with the interrupted instruction.

12. Apparatus according to claim 7, wherein each processing element includes means connecting the said output channel of the arithmetic unit to write to the memory and further means responsive to the state of one of the said single-bit registers to inhibit the arithmetic unit from writing to the memory when the said register is in a predetermined one of its states.

13. Apparatus according to claim 12 wherein two of said single-bit registers serve as operand registers, and a third serves as a carry-bit register for the arithmetic unit of the element and, wherein the elements are arranged in rows and columns, and each element includes means for connecting the carry input of the of the arithmetic unit of that element to the carry output of the arithmetic unit of the preceding element in the same column, so as to produce an addition with ripple carry between two numbers, one stored in the first operand registers of the elements of the column, and the other stored in the second operand registers of the column.

14. Apparatus according to claim 13 wherein said connecting means in each element is alternatively operable to connect the carry input of the arithmetic unit of that element to the sum output of the arithmetic unit of the preceding element in the same column, so as to produce, in the last element of the column, the modulo-2 sum of the contents of all the operand registers in the column.

15. Apparatus according to claim 13 wherein one of said operand registers has a latch circuit connected to it, operable to prevent data from being written into that register unless the contents of the register have a predetermined value.

* * * * *